No. 654,632. Patented July 31, 1900.
J. J. HEILMANN.
GEAR FOR MOTOR CARS.
(Application filed Dec. 19, 1899.)
(No Model.) 2 Sheets—Sheet 2.
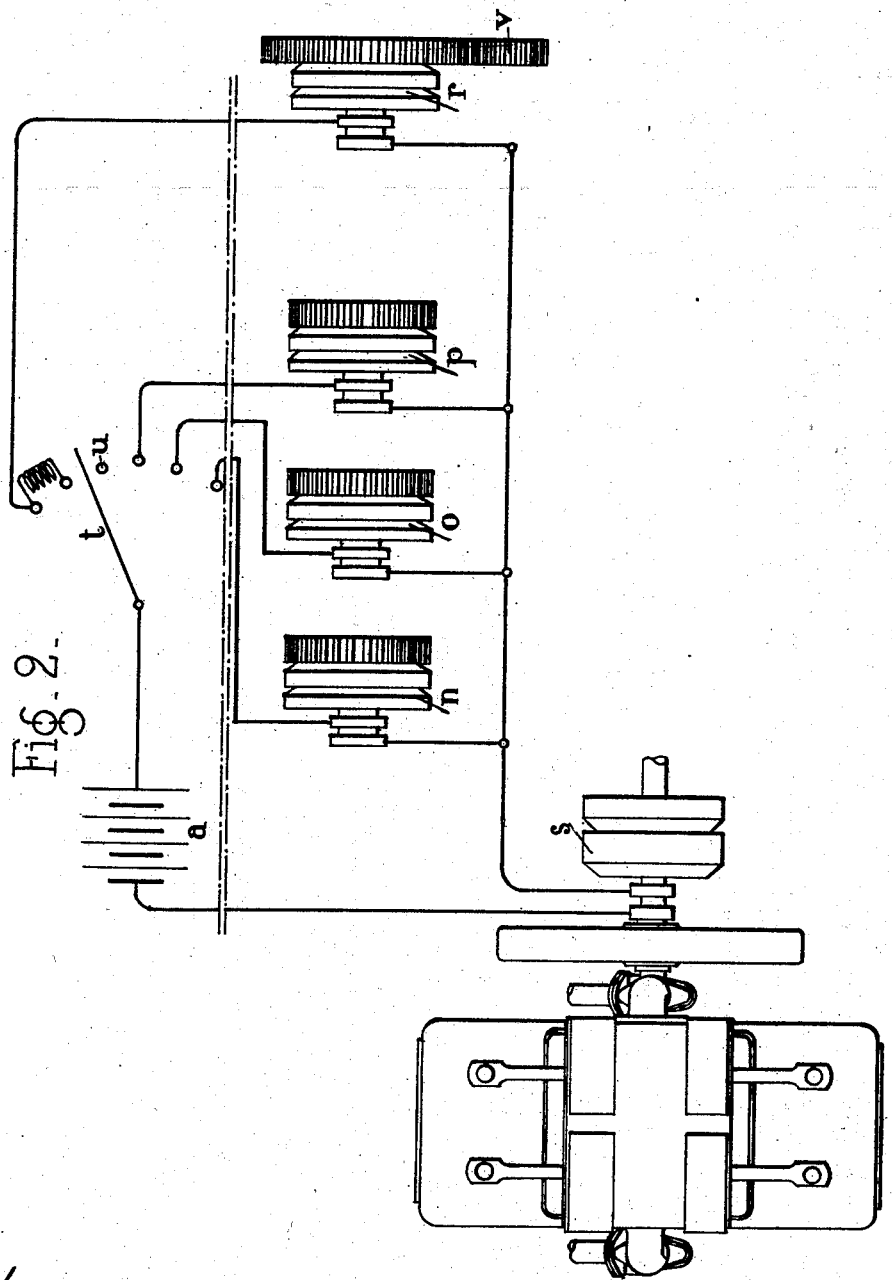

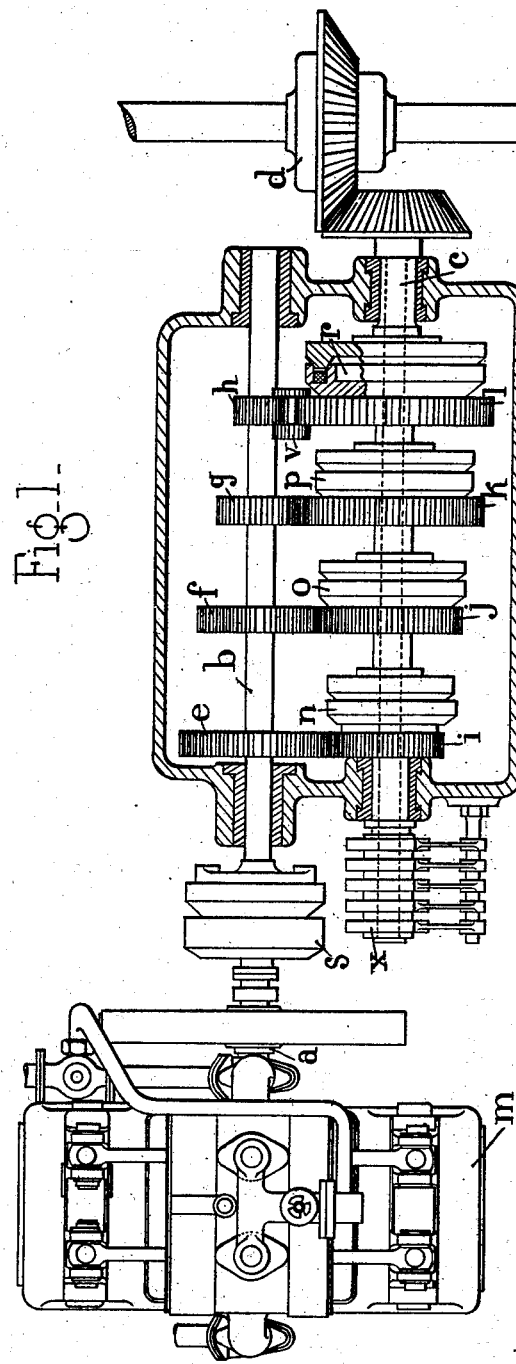

UNITED STATES PATENT OFFICE.

JEAN JACQUES HEILMANN, OF PARIS, FRANCE.

GEAR FOR MOTOR-CARS.

SPECIFICATION forming part of Letters Patent No. 654,632, dated July 31, 1900.

Application filed December 19, 1899. Serial No. 740,883. (No model.)

*To all whom it may concern:*

Be it known that I, JEAN JACQUES HEILMANN, a citizen of the Republic of France, residing at Paris, in the Department of Seine and Republic of France, have invented certain new and useful Improvements in Gear for Motor-Cars; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to gear for disengaging and changing the speed of gear for motor-cars and the like.

This apparatus consists of the special combination of magnetic engaging and disengaging devices, which will now be described in reference to the accompanying drawings.

Figure 1 represents in plan the device applied to an oil-engine for driving a motor-car; but it must be understood that it is readily applicable to any kind of motor. Fig. 2 shows diagrammatically the arrangement of the electric circuits for operating the clutches.

$m$ is the motor, the axle $a$ of which is prolonged by another axle $b$, carrying the toothed wheels $e f g h$, which constantly engage with other toothed wheels $i j k l$, concentrically mounted on the axle $c$. Between each wheel $i j k l$ and the axle $c$ connection is made by a magnetic clutch (marked $n o p r$, respectively) in such a way that when the current is switched onto one of these clutches the axle $c$ is put into motion at the speed which corresponds to the particular gearing of the wheels. The other wheels then turn loosely on the axle $c$. Between the axle of the motor and the axle $b$ is arranged another magnetic clutch $s$, which comes into play when one or other of the clutches $n o p r$ are operated or switched on. In other words, the electric circuits are so arranged that each time the circuit is closed the current passes through the clutch $s$. Fig. 2 shows diagrammatically the arrangement of the circuits for effecting this result. The source of electricity which operates the clutches (either accumulators or a small dynamo) is put in communication with the clutch $s$ and one of the clutches $n o p r$ in series with the first by means of a switch-commutator $t$, placed handily to the driver of the vehicle. The successive contacts of this switch correspond to the successive clutches $n o p r$—that is to say, for various speeds. When the switch is at the neutral contact $u$, the current is interrupted and the clutch $s$ is disengaged, the motor merely running free. The noise and wear are thus reduced to a minimum during the stoppage of the vehicle. The axle $c$ is connected to the wheels of the vehicle through the gears $d$ or by any appropriate means.

The clutch $r$ is arranged to propel the motor-car in a backward direction, and for this reason wheel $h$ engages with an intermediate wheel $v$ and the latter with the wheel $l$, so that axle $c$ is given a rotation in a reverse direction to that given by the other wheels on shaft $b$. This clutch can at the same time be used as a brake, and in order to graduate the strength of this brake one or more resistances are inserted in the circuit. Thus the forward motion, the changes of speed, the backward motion, and the braking of the vehicle are controlled by the same switch-handle $t$ in the different positions.

When a battery of accumulators is employed as the source of electricity, I maintain the charge by means of a small dynamo operated by the motor. Further, I can supply current to all the accessory services of the vehicle, such as the lighting and the ignition of explosive gases in the petroleum-engine.

In order to effect the silent operation of the clutches and to lubricate the various devices, the gearing is incased within an oil-bath or casing. The axle $c$, which carries the clutches, is made hollow, so that the conducting-wires which are connected to the contact-rings $x$ are brought to the end of the shaft and out of the oil-casing. A single return-wire and return contact-ring can be employed for all the clutches carried by the axle $c$.

Having described my invention, what I claim, and desire to secure by Letters Patent, is—

An engaging and variable-speed gearing for motor-cars and the like, consisting of the combination of a shaft connected to the motor, a main magnetic clutch, a series of tooth-wheels of various diameters mounted rigidly on the said shaft, a second shaft, a series of tooth-wheels of corresponding sizes carried loosely upon the latter shaft which is adapted to drive the vehicle, a secondary magnetic clutch arranged to coact with each of the latter wheels so as to couple any one of said wheels to the shaft, and means for connecting any one of the secondary magnetic clutches in series with the main magnetic clutch and a source of electricity, substantially as described.

In witness whereof I have hereunto set my hand in presence of two witnesses.

JEAN JACQUES HEILMANN.

Witnesses:
 EDWARD P. MACLEAN,
 HENRY DANZER.